United States Patent [19]

Gordon

[11] 3,805,145

[45] Apr. 16, 1974

[54] OPERATIONAL AMPLIFIER STABILIZED POWER SUPPLY

[75] Inventor: Bernard M. Gordon, Magnolia, Mass.

[73] Assignee: Gordon Engineering Company, Watertown, Mass.

[22] Filed: Apr. 12, 1971

[21] Appl. No.: 133,410

Related U.S. Application Data

[62] Division of Ser. No. 811,781, April 1, 1969, Pat. No. 3,603,945.

[52] U.S. Cl. .................... 323/16, 323/100, 330/110, 330/148

[51] Int. Cl. .............................................. G05f 1/46

[58] Field of Search ....... 330/9, 30 R, 69, 100, 110, 330/148; 323/23, 16, 100

[56] References Cited

UNITED STATES PATENTS 3,133,242 5/1964 Harries ................................ 323/22

OTHER PUBLICATIONS

Handbook of Operational Amplifier Applications, Burr–Brown Research Corp., Tucson, Arizona, First Edition, Copyright 1963, pp. 5, 7, 8, 50.

*Primary Examiner*—Herman Karl Saalbach
*Assistant Examiner*—James B. Mullins
*Attorney, Agent, or Firm*—Morse, Altman, Oates & Bello

[57] ABSTRACT

A voltage source for generating precision reference signals includes a pair of differential input operational amplifiers serially connected in stages. One input terminal and the output terminal of each operational amplifier are resistively connected, the voltage appearing at the output terminal of each operational amplifier being stabilized by the stability factor of the operational amplifier. A stabilized voltage at the output terminal of each stage is applied to the other input terminal of the other stage.

4 Claims, 3 Drawing Figures

OPERATIONAL AMPLIFIER STABILIZED POWER SUPPLY

CROSS-REFERENCE TO RELATED APPLICATIONS

The present application is a division of Ser. No. 811,781, filed Apr. 1, 1969 now U.S. Pat. No. 3,603,975.

BACKGROUND AND SUMMARY

The present invention relates to both analog to digital and digital to analog converters, and more particularly to data form converters employing the successive approximation technique. In the successive approximation technique, analog to digital or digital to analog conversion is accomplished by switching, in a logically programmed sequence, a reference voltage with respect to a resistive divider network to provide for comparison between reference signal increments and input data signal increments. Such systems have suffered from transients, which have been introduced as a result of the switching, and from the necessity for interface circuitry, which has permitted the switching to occur at a reference potential.

A primary object of the present invention is to provide, in both analog to digital and digital to analog converters, a novel successive approximation technique involving switching at ground potential in a logically programmed sequence rather than switching a reference voltage in such a sequence, whereby the transients are avoided and the interface circuitry is minimized. Another object of the present invention is to provide a precision reference voltage source, characterized by a novel operational amplifier arrangement that renders the output voltages extremely unresponsive to input voltage fluctuations.

The invention accordingly comprises the apparatus possessing the construction, combination of elements, and arrangement of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description taken in connection with the accompanying drawings wherein.

DETAILED DESCRIPTION

Figure 1:
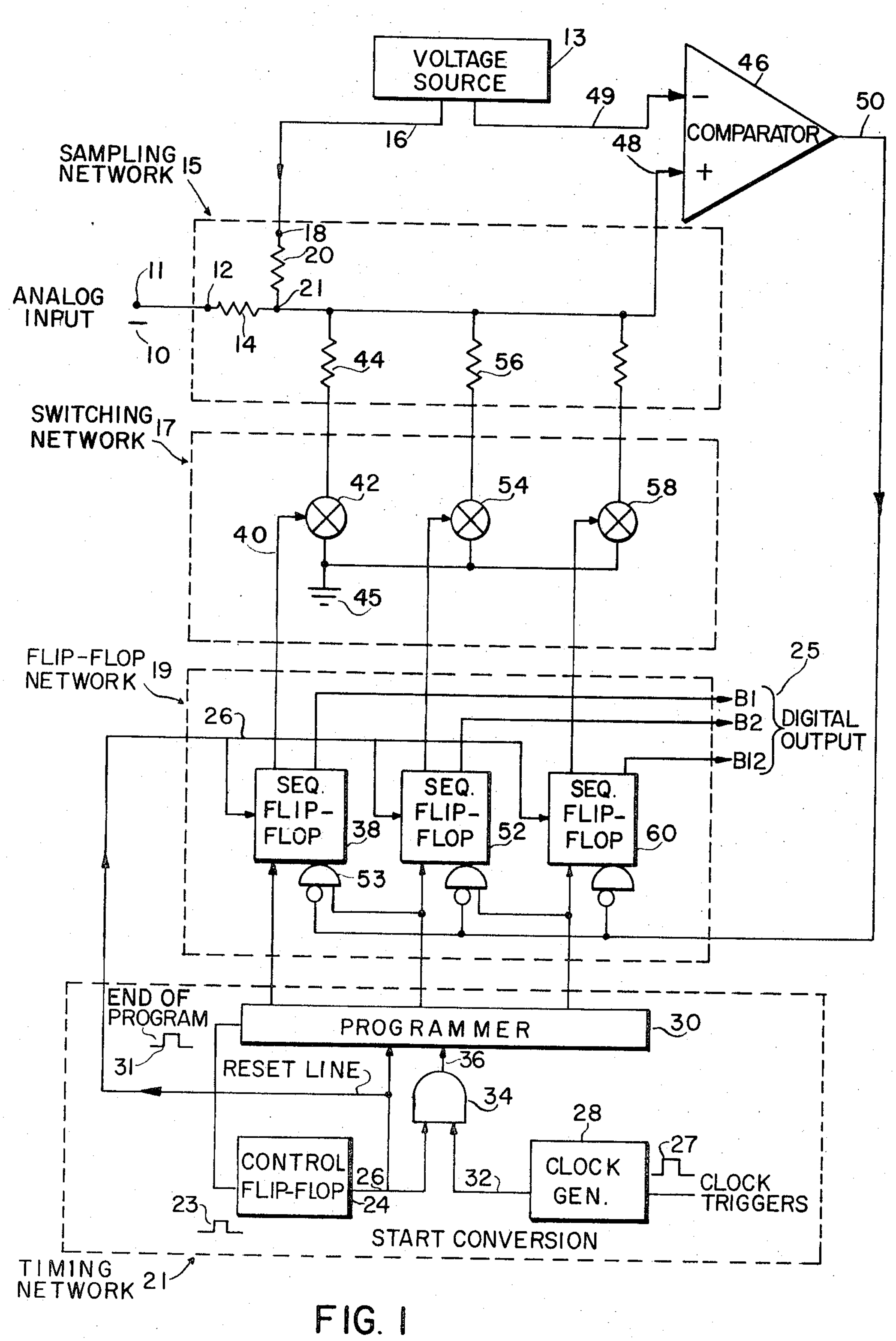
FIG. 1 is a block and schematic diagram of an analog to digital converter embodying the present invention.

Generally, the analog to digital system of FIG. 1 comprises an input terminal 11 for receiving an analog signal, a voltage source 13 for supplying precision reference voltages, a sampling network 15 including a sequence of precision resistors, a switching network 17 including a plurality of switching devices for controlling current flow through the precision resistors to a ground potential 45, a flip-flop network 19 including a plurality of sequential flip-flops for controlling the state of each of the switching devices, a timing network 21 for controlling the sequential flip-flops, a comparator 46 for comparing a reference voltage with voltages established by current flow through the sampling network, and output terminals 25 for presenting a digital signal. In the following discussion, for convenience, a switching device will be designated in the conducting state when its correlative sequential flip-flop is in state ONE and will be designated in the non-conducting state when its correlative sequential flip-flop is in state ZERO.

In the device of FIG. 1, twelve comparisons, i.e., decisions, are required for each complete conversion. A decision involves passing a current through a switching device by triggering the appropriate sequential flip-flop to state ONE in response to one of a sequence of program pulses and then either allowing this current to continue to pass through the switching device or returning the switching device to the non-conducting state, depending upon the signal appearing at an input 48 to comparator 46. If it is specified that the switching device be returned to the non-conducting state, a reject pulse 50 is generated by comparator 46 simultaneously with the next program pulse, and the same flip-flop is retriggered to state ZERO. The final state of each sequential flip-flop represents the analog signal in digital form. In the illustrated converter of FIG. 1, there are twelve sequential flip-flops. It will be understood that in alternative embodiments, the number of sequential flip-flops in other than twelve, for example, sixteen.

The final states of the aforementioned twelve sequential flip-flops are produced as follows. The operation of digitizing one of a series of quasi-instantaneous samples of analog input voltage 10 is initiated by a start trigger 23, which triggers control flip-flop 24 to the ONE state. An output 26 of control flip-flop 24 resets the sequential flip-flops to state ZERO. Also, clock triggers 27 are applied to a clock generator 28. An output 32 of clock generator 28 and output 26 of control flip-flop 24 are applied to a logic circuit 34. An output 36 of logic circuit 34 is applied to a programmer 30, which generates a series of program pulses. For convenience, the program will be consecutively designated, as program pulse No. 1, program pulse No. 2, etc. Program pulse No. 1 is applied to the first sequential flip-flop 38, which having been triggered to state ZERO by reset pulse 26, now is triggered to state ONE. Sequential flip-flop 38, having been triggered to state ONE by program pulse No. 1, causes a switching device 42 to change from the non-conducting state to the conducting state, thereby allowing current to flow through a resistor 44 to a ground potential 45. The difference between (1) the sum of the current from a reference voltage 16 and analog voltage 10 and (2) the precision current through switching device 42 is applied to a summing bus 48 at the input to comparator 46. When the input voltage at summing bus 48 is equal to or more positive than a reference voltage 49, an accept pulse is generated from comparator 46 for application to the sequential flip-flops. When the input voltage at summing bus 48 is negative with respect to the reference voltage 49, a reject pulse is generated from comparator 46 to the sequential flip-flops. Program pulse No. 2 is applied to the second sequential flip-flop 52, which having been triggered to state ZERO by reset pulse 26, now is triggered to state ONE. Program pulse No. 2 is also applied to a logic circuit 53, associated with the sequential flip-flop 38. Application of both the reject signal from comparator 46 and program pulse No. 2 to logic circuit 53 resets sequential flip-flop 38 to state ZERO. If an accept signal is generated from comparator 46, sequential flip-flop 38 remains in state ONE. The conversion is terminated when a program terminate pulse 31, for example from programmer 30, is applied to control flip-flop 24. Program terminate pulse 31 is generated from programmer 30 either when the voltage at summing bus 48 is equal to the reference voltage 49 or when program pulse No. 12, for example, is applied to the twelfth sequential flip-flop 60. The final state of each sequential flip-flop represents one bit of a digital signal, which delineates the analog voltage in digital form.

Figure 2:
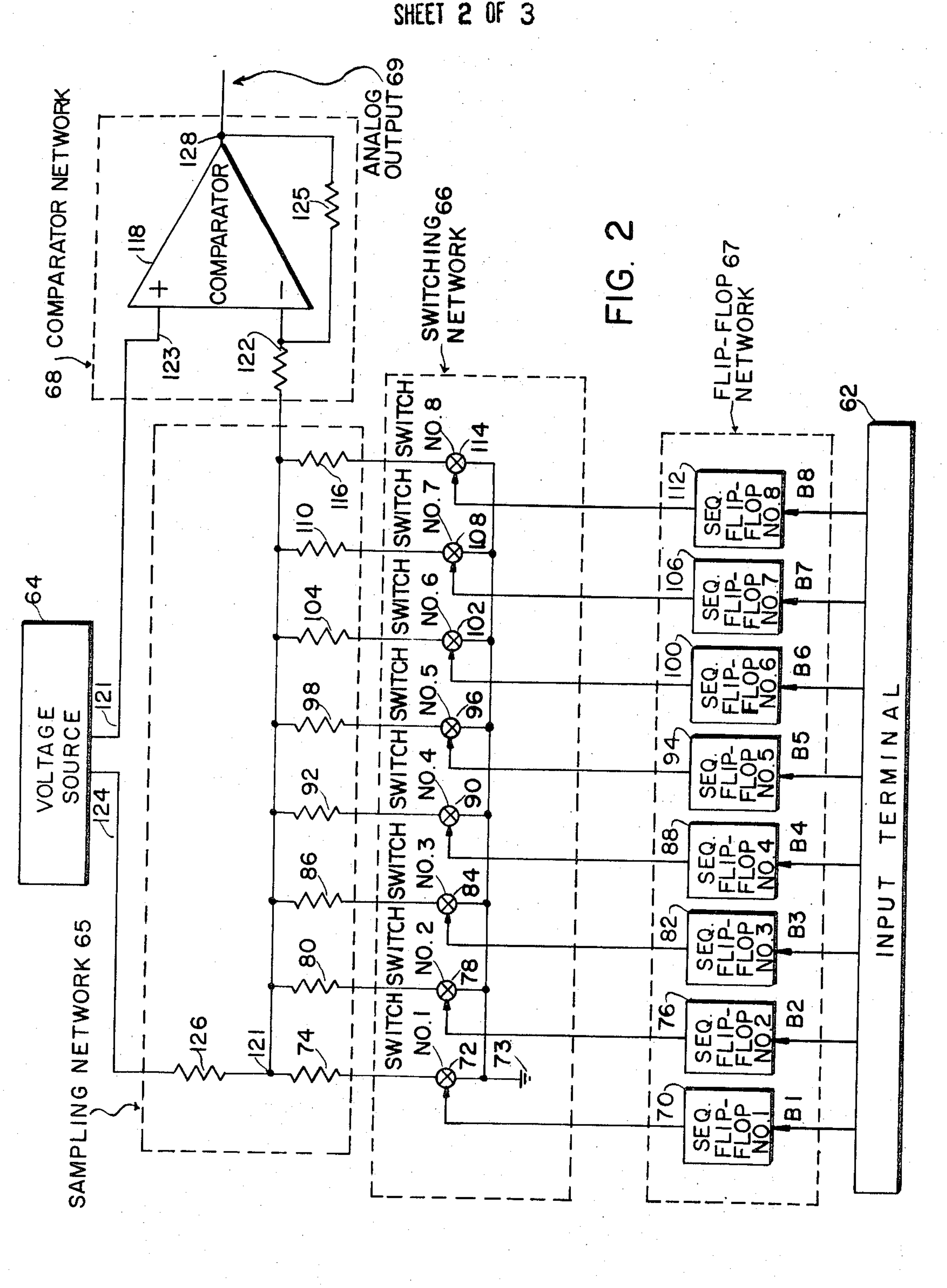
FIG. 2 is a block and schematic diagram of a digital to analog converter embodying the present invention.

FIG. 2 illustrates an eight bit digital to analog converter. Generally, the converter comprises an input terminal 62 for receiving a digital signal, a voltage source 64 for supply reference voltage, a sampling network 65 containing a sequence of precision voltage components, for example, precision resistors, a switching network 66 comprising a plurality of switching devices for controlling current flow through the precision resistors to a ground potential 73, a flip-flop network 67 containing a plurality of sequential flip-flops for controlling the state of the switching device, a comparator network 68 for comparing the current flow through the sampling network with that establishing a reference voltage 121, and an output terminal 69 for presenting the digital signal as an analog signal. In the illustrated converter there are eight sequential flip-flops. It will be understood that in alternative embodiments the number of sequential flip-flops is other than eight, for example, twelve.

In the device of FIG. 2, a digital signal is applied at 63 to input terminal 62. The digital signal from the input terminal 62 is applied to a sequence of flip-flops 70, 76, 82, 88, 94, 100, 106, and 112, each sequential flip-flop receiving one bit of the digital signal. The state of a sequential flip-flop is determined by the digital bit applied to that flip-flop, i.e., a flip-flop is designated state ONE if its corresponding digital bit is ONE and is designated state ZERO if its corresponding digital bit is ZERO. Associated with and controlled by sequential flip-flops 70, 76, 82, 88, 94, 100, 106 and 112 are switching devices 72, 78, 84, 90, 96, 102, 108 and 114, respectively. A switching device is designated as being in the conducting state when its correlative sequential flip-flop is in state ONE and is designated as being in the non-conducting state when its correlative sequential flip-flop is in state ZERO. Each of switching devices 72, 78, 84, 90, 96, 102, 108 and 144 is connected to one of precision resistors 74, 80, 86, 92, 98, 104, 110 and 116. A predetermined voltage level (a reference voltage 124 less the voltage drop across a resistor 126) is applied to a junction 121, the union of the precision resistors. When a switching device is in the conducting state, a predetermined current is permitted to flow from the junction 121 through the corresponding precision resistor to ground potential 73. The value of each precision resistor is so weighted that the current through each contributes to a voltage applied at a summing bus 122 in proportion to its value. A comparator 118, for example a closed loop operational amplifier, compares the voltage at summing bus 122 with the reference voltage applied as at 123 via a feedback resistor 125. That is, a current flows from a junction 120 at the output of the comparator through the feed back resistor 125 to summing bus 122 until the voltage as at 122 is equal to the voltage as at 123. Hence, the voltage at the output 69 of the comparator 118 is proportional to the voltage at summing bus 122. As previously stated, the voltage at summing bus 122 is dependent upon the current through precision resistors 74, 80, 86, 92, 98, 104, 110 and 116. Therefore, the voltage at output 69 represents the digital signal in analog form.

Figure 3:
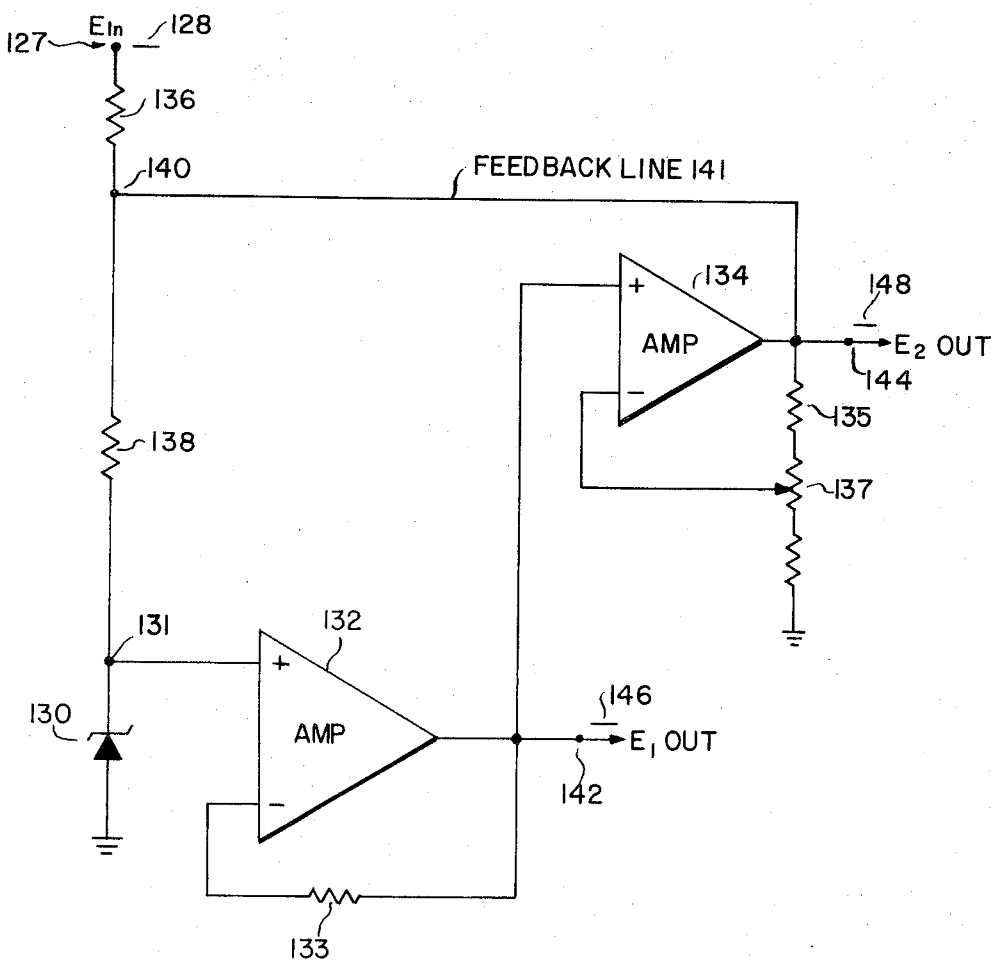
FIG. 3 is a schematic diagram of a reference voltage source that is particularly applicable to the converters FIG. 1 and FIG. 2.

FIG. 3 is a schematic diagram of the voltage source hereinbefore mentioned in the discussion of FIGS. 1 and 2. In general, this voltage source comprises an input terminal 127 for receiving an external voltage, two operational amplifiers 132 and 134 for generating reference voltages 146 and 148 respectively, a voltage referencing device 130 for applying a relatively constant voltage to the operational amplifier 132, a feedback line 141 for stabilizing the voltage applied to the voltage referencing device, and two output terminals 142 and 144 for presenting the output voltage of the operational amplifiers. In one example, the external voltage 128 applied at terminal 127 is 15 volts, the voltage referencing device 130 is a 5 volt zener diode, the gain of operational amplifier 132 is one, and the gain of operational amplifier 134 is two.

The external voltage 128 is applied to the cathode of zener diode 130. Due to the operation of the zener diode, the voltage at a junction 131 remains at five volts plus or minus the operating tolerance of the zener diode. The voltage as at 131 is applied to operational amplifier 132. The 5 volt output 146 of operational amplifier 132, stabilized by the feedback resistor 133, is applied to the input of operational amplifier 134. The 10 volt output 148 of operational amplifier 134, stabilized by the feedback resistors 135 and 137, is applied via negative feedback line 141 as a negative feedback current to a junction 140 between input resistors 136 and 138. This negative feedback current tends to stabilize the voltage at the cathode of the zener diode. That is in the foregoing example, if the external voltage is increased beyond 15 volts, a negative feedback current from the operational amplifier 134 contributes to the voltage at junction 140 in such a manner as to offset the increase in the external voltage. Hence, the voltage applied to the cathode of zener diode 130 is further controlled by the stability of operational amplifier 134. A typical stability factor for an output reference voltage using the circuit of the present invention is 3 micro volts/volt, i.e., the reference voltages 146 and 148 will change 3 microvolts for each 1 volt change in input voltage.

Since certain changes may be made in the foregoing disclosure without departing from the scope of the invention herein involved, it is intended that all matter contained in the above description and shown in the accompanying drawings be constued in an illustrative and not in a limiting sense.

What is claimed is:

1. A device for generating a stable output signal, said device comprising:

a. an input terminal for receiving an input signal;

b. first operational amplifier means having first and second input terminals and an output terminal, said input terminal operatively connected to said first operational amplifier means first input terminal;

c. first resistor means operatively connected between said first operational amplifier means second input terminal and output terminal for stabilizing a signal at said first operational amplifier means output terminal;

d. second operational amplifier means having first and second input terminals and output terminal, said first operational amplifier means output terminal operatively connected to said second operational amplifier means first input terminal;

e. second resistor means operatively connected between said second operational amplifier means second input terminal and output terminal for stabilizing a signal at said second operational amplifier means output terminal; and f. third resistor means operatively connected between said second operational amplifier means output terminal and said first operational amplifier means first input terminal for stabilizing said signal at said first operational amplifier means first input terminal, said stable output signal presented said second operational means output terminal being stabilized by said first and second operational amplifier means.

2. The device as claimed in claim 1 including reference means operatively connected between said first operational amplifier means first input terminal and a return for maintaining said signal at said first operational amplifier means first input terminal at a constant level, said signal applied to said second operational amplifier means first input terminal stabilized by said first operational amplifier means and said signal applied to said first operational amplifier means first input terminal stabilized by said second operational amplifier means.

3. A device for generating a stable voltage, said device comprising:

a. an input terminal for receiving an input voltage signal;

b. first operational amplifier means having at least first and second input terminals and an output terminal, said first operational amplifier means first input terminal operatively connected to said input terminal, said input voltage signal applied to said first operational amplifier means first input terminal, said first operational amplifier means output terminal resistively connected to said first operational amplifier means second input terminal, a first signal presented at said first operational amplifier means output terminal being related to said input voltage signal and stabilized by said first operational amplifier means;

c. second operational amplifier means having at least first and second input terminals and output terminal, said second operational amplifier means first input terminal operatively connected to said first operational amplifier means output terminal, said first signal applied to said second operational amplifier first input terminal, said second operational amplifier output terminal resistively connected to said second operational amplifier means second input terminal, a second signal presented at said second operational amplifier means output terminal being related to said first signal and stabilized by said second operational amplifier means;

d. resistor means operatively connected between said second operational amplifier means output terminal and said first operational amplifier means first input terminal, said second signal applied to said first operational amplifier means first input terminal via said resistor means, said second signal being a stable voltage signal which is stabilized by said first and second operational amplifier means.

4. The device as claimed in claim 3 including reference voltage component means operatively connected between said first operational amplifier means first input terminal and a return for maintaining said input voltage signal as at said first operational amplifier means first input terminal at a constant level.

* * * * *